Aug. 3, 1926.
J. KLEIN
1,594,530
SPRING SUSPENSION
Filed March 15, 1926
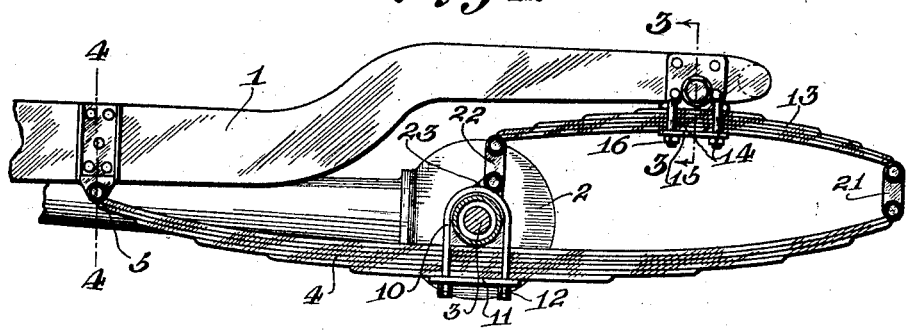
Inventor
John Klein.
By William C. Linton
Attorney Patented Aug. 3, 1926.

1,594,530

UNITED STATES PATENT OFFICE.

JOHN KLEIN, OF WASHINGTON, DISTRICT OF COLUMBIA, ASSIGNOR OF ONE-HALF TO B. AGEE BOWLES, OF WASHINGTON, DISTRICT OF COLUMBIA.

SPRING SUSPENSION.

Application filed March 15, 1926. Serial No. 94,962.

This invention relates to improvements in spring suspensions for vehicles and more especially to suspensions of this character for motor driven vehicles, whereby shocks and other abnormal stresses imparted to the equipped vehicle running gear will be directly transmitted to and diffused through the spring construction, thereby effectually avoiding the rough jolting, jerking and rebounding of the vehicle body.

It is also an object of the invention to provide a spring suspension of the character indicated, wherein the transmission of detrimental stresses to the vehicle driving gear, caused by the traversing of rough or uneven ways, will be reduced to minimum and hence, will eliminate, to a great extent, breakage or other damage of said driving gear or mechanism.

The invention may be stated to provide, more specifically, a spring suspension including an arrangement of opposed semi-elliptical springs so relatively positioned as to cause the transmission of major stresses to the heavier ones thereof, whereas the pailings of such stresses will be then transmitted to and diffused through the lighter spring, rather than directly to the vehicle chassis or body, the positioning of the lighter spring being such that it will counter, to a certain degree, the reverse flexing or rebound of the heavier spring and by consequence, eliminating the highly undesirable and ofttimes dangerous rebounding of the equipped vehicle body.

Other objects of the invention will be in part obvious and will be in part pointed out as this description proceeds on through the specification.

In order that the invention and its mode of operation may be readily understood by those skilled in the art, I have in the accompanying illustrative drawings and in the specification based thereupon, set out one possible embodiment of the invention.

In these drawings:—

Figure 1 is a side elevation of the spring suspension as connected to one side of the chassis and driving gear of a motor driven vehicle, Figure 2 is a top plan view of the same, Figure 3 is an enlarged transverse section taken on the line 3—3 of Figure 1 looking in the direction in which the arrows point, and Figure 4 is a vertical transverse section taken on the line 4—4 of Figure 1 looking in the direction in which the arrows point.

Having more particular reference to the drawings, in connection with which like characters of reference will designate corresponding parts throughout, it may be stated that the improved spring suspension is especially adapted for usage in connection with vehicles of the motor driven type, wherein such vehicles include a chassis, fragmentally illustrated and designated herein by the numeral 1 and driving axles connected to differential gearing, all of which are housed in a casing designated in its entirety by the numeral 2; it being understood in this connection, that the driving axles 3 are extended through portions of said casing 2 in the manner indicated in the Figure 1, whereby driving connection as between the same and the rear wheels 4 of the equipped vehicle, may be established.

The invention may be stated to comprise relatively spaced pairs of springs, and for purpose of convenience, the description hereinafter contained, will be directed to but one of the spring suspensions, that is, to but one of the spring suspension devices upon one side and rearward portion of the vehicle chassis 1, it being understood that such description will suffice for both of such section devices. Accordingly, the spring suspension device referred to, comprises an upwardly disposed semi-elliptical leaf spring indicated in its entirely by the numeral 4, said leaf spring extending longitudinally of and substantially parallel with the rearward portion of the vehicle chassis 1 as is shown in the Figure 2; the upturned forward or inner end of the spring being pivotally connected to a bearing bolt 5 to a laterally offset bearing bracket 6, said bracket being formed upon its inner side with a substantially right angularly formed engaging or connecting arm 7, braced at one of its angles by means of an integral web portion 8. The outer side of this angular engaging arm 7 is adapted to be snugly engaged with an adjacent portion of the vehicle chassis 1, in the manner indicated in the Figure 4, whereupon rivets, bolts or other suitable fastening devices generally designated by the numeral 9 are passed therethrough and anchored in adjacent portions of the chassis 1, thus producing a rigid and positive connection as between this bracket 6 and the chassis and therefor, affording a firm and positive pivotal bearing for the forward or inner end of the upwardly disposed longitudinally extending semi-elliptical spring 4.

The intermediate portion of the semi-elliptical spring 4 is firmly and rigidly secured to an adjacent portion of the housing 2 by means of an inverted U-shaped clamping bolt 10, the extremities of which, that is, the opposite leg portions thereof, are passed through complementally disposed openings formed in the adjacent portion of said spring 4, whereupon a clamping or locking plate 11 is engaged with such extremities and locking nuts 12 then turn into engagement with the screw threaded ends of the opposite legs of said clamping bolt, thus, effectually clampingly connecting the intermediate portion of said spring 4 with the housing 2.

From the description thus far, it will be seen that a spring connection has been established as between the forward or inner portion of the semi-elliptical spring 4 and the chassis 1 and the housing 2 and the driving axle. To effect a spring connection between the rearward portion of the spring 4, the housing 2 and the rearward end of the chassis 1, a lighter and shorter semi-elliptical spring 13 is provided, this spring being so arranged that its opposite end portions or extremities are downwardly disposed while the intermediate portion thereof is pivotally connected to the adjacent end and side portion of the chassis 1 through the medium of substantially U-shaped clamping bolts 14 embracingly engaging such intermediate portion thereof and having a clamping plate 15 engaged over the opposite side and intermediate portion of the spring 13 whereupon locking nuts 16 are engaged with the extremities of said bolts; the basal portions of the bolts being engaged over the extremities of a pivotal bearing sleeve 17 received upon a pivot bolt 18 extending outwardly and laterally from an angle securing bracket 19, which bracket snugly engages the adjacent outer side of the chassis 1 in the manner as indicated in the Figure 3, whereupon a connection therebetween is effected through the medium of rivets, bolts or other suitable fastening devices, generally designated by the numeral 20. Thus, it will be appreciated that a pivotal connection as between the intermediate portion of the shorter semi-elliptical spring 13 and the chassis 1 will be effected.

The outer or rearward end of the shorter semi-elliptical spring 13 is pivotally engaged by one side of an ordinary shackle connection 21, the opposite side of which is connected to the adjacent and rearward extremity of the main semi-elliptical spring 4, whereas the forward or inner end of the shorter semi-elliptical spring 13 is pivotally connected through a shackle connection 22 to an adjacent portion of the casing 2, in the manner as indicated at 23. Thus, it is apparent that a spring connection is established as between the housing 2, the rearward portion of the main spring 4 and the rearward end of the chassis 1, this being through the auxiliary or secondary spring 13.

In operation of my improved spring suspension device, with the imparting of jolts or other abnormal stresses to the vehicle running gear, caused by the traversing of rough or uneven ways such abnormal stresses will be first directed to the main spring 4 wherein they will be partially diffused or absorbed, while the pailings of such stresses will be then transmitted to the shorter and lighter auxiliary semi-eliptical spring 13, through which they will be evenly diffused so that their transmission to the chassis 1 will be avoided in many instances and even in the most exaggerated instances will be reduced to minimum. By reason of the fact that the main spring 4 and the auxiliary spring 13 are arranged in oppositely disposed relationship, that is, the main spring 4 has its opposite extremities extending upwardly whereas auxiliary spring 13 has its opposite extremity extending downwardly, it will be appreciated that with the transmission of stress or other abnormal conditions to said main spring 4, vigorous reflexing or rebounding of said main spring 4 will be countered by reason of the connection of the auxiliary spring 13 thereto and by consequence, the transmission of abrupt and ofttimes accentuated and dangerous rebound to the vehicle body arranged upon the chassis 1 will be prevented. Likewise, because of the manner in which the abnormal stresses imparted to the vehicle running gear are transmitted to and diffuse through the springs 4 and 13, it will be appreciated by workers skilled in the art that such stresses will be minimized so that when reaching the driving gear housed in the casing 2, the damaging or detrimental effects thereof will be avoided.

Manifestly, the construction shown is capable of considerable modification, and such modification as is within the scope of my claims, I consider within the spirit of my invention.

I claim:—

1. A spring suspension for vehicles comprising in combination with a vehicle chassis and driving gearing casing a longitudinally disposed and upwardly extending semi-elliptical spring means, means for securing the intermediate portion of said means to a portion of the driving gear casing and the forward end of said means being pivotally connected to a portion of the chassis, a lighter and shorter spring means disposed coincidentally with the first spring means, the outer end of the second spring means being pivotally connected to the adjacent end of said first spring means, and the inner end of said second spring means being pivotally connected to a portion of the driving gear casing, and means for pivotally securing the intermediate portion of said second spring means to the adjacent rearward portion of the chassis.

2. A spring suspension for vehicles comprising in combination with a vehicle chassis and driving gear casing, a longitudinally disposed and upwardly extending semi-elliptical spring, means for securing the intermediate portion of said spring to a portion of the driving casing, the forward end of said spring being pivotally connected to an adjacent portion of the chassis, a slighter and shorter semi-elliptical spring disposed coincidentally with the first spring and having its opposite extremities extended downwardly and opposed to the adjacent portion of the first spring, the outer end of said second spring being pivotally connected to the adjacent end of said first spring and the inner end of said second spring being pivotally connected to the driving gear casing, and means for pivotally connecting the intermediate portion of said second spring to the adjacent and rearward portion of the chassis.

3. A spring suspension for vehicles, comprising in combination with the vehicle chassis and driving gear casing, a pair of relatively opposed longitudinally extending semi-elliptical springs, the lowermost of said springs being of greater length and size than the upper of the springs, the intermediate portion of said lower spring being fixedly connected to a portion of the driving gear casing, means for pivotally connecting the inner end of said lower spring to a portion of the vehicle chassis, a pivotal connection between the outer and opposed ends of said upper and lower springs, means for pivotally connecting the inner end of said upper spring to a portion of the driving gear casing, and a bracket connection for pivotally securing and mounting the intermediate portion of said upper spring upon the adjacent rearward portion of the chassis.

In witness whereof I have hereunto set my hand.

JOHN KLEIN.